March 5, 1963  H. J. KIEFER ET AL  3,080,246
METAL COATING COMPOSITION, METHOD FOR PREPARING
SAME AND COATED METAL SHEET
Filed June 8, 1959
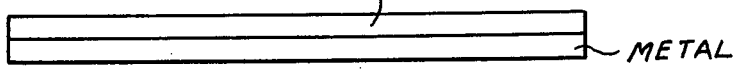
HARRY J. KIEFER, JR.
GEORGE E. PEKAREK
ALBERT ZIER
   INVENTORS
BY *G. G. Christensen*
ATT'Y.

United States Patent Office 3,080,246
Patented Mar. 5, 1963

3,080,246
METAL COATING COMPOSITION, METHOD FOR PREPARING SAME AND COATED METAL SHEET
Harry J. Kiefer and George E. Pekarek, Cleveland, and Albert Zier, Parma, Ohio, assignors to The Glidden Company, Cleveland, Ohio, a corporation of Ohio
Filed June 8, 1959, Ser. No. 818,514
6 Claims. (Cl. 106—285)

This invention relates primarily to improved metal coating compositions and relates more particularly to such compositions adapted for use in direct contact with tin-plated ferrous metal, e.g. such as used in making tin cans. The invention relates particularly to coating compositions whose film-forming material consists essentially of about 90%–99.99% of acid-modified hydrocarbon drying oil of the polymeric type prepared in accordance with U.S. Patents 2,652,342 and 2,683,162 from a major amount of conjugated diolefin having 4 to 6 carbon atoms (e.g. polybutadiene homopolymer or butadiene/styrene copolymer) in admixture with a small amount, e.g. .01–10% by weight, of certain chelated compounds of polyvalent metal(s) identified hereinafter.

Hydrocarbon drying oils of the type referred to above have numerous qualities fitting them for use as sanitary lining material for tin cans in which edible products are to be packed. However, it has been found that such oils are extremely sensitive during application (especially in roll-coating methods of application) to surface conditions encountered on tin-plated iron or other tin-plated ferrous metal sheets, the sensitivity being exhibited in the form of cratering, ridging, eyeholing, crawling, etc. of the wet film when applied to the clean tin-plate. Similar or analogous defects are also observed when the coatings are applied to other metals such as aluminum, brass, black-iron, copper, terne-plate, galvanized iron, etc. Efforts to correct the situation through a metallurgical approach have been ineffective. The problem therefore, has been reduced to that of so modifying the drying oil coating as to overcome the said sensitivity. The present invention provides the problem with a solution which has been found to be eminently satisfactory not only in overcoming the film defects due to the surface condition of the tin and other metals, but also in improving the intercoat adhesion between the cured hydrocarbon oil film and vinyl and other topcoat films. Moreover, the developments which constitute the present invention have been found to improve significantly the resistance qualities exhibited by the hydrocarbon drying oil films per se.

Accordingly, it is an object of this invention to provide an improved polymeric hydrocarbon drying oil coating composition of the type disclosed briefly hereinabove and disclosed more fully hereinafter.

It is another object to provide an improved tin-plated ferrous metal sheet and/or other metal stock coated with our improved coating composition(s).

Still another object is to provide an improved method for preparing coating compositions and coated metal sheets and stocks of the classes identified in the preceding objects, the products and compositions being particularly characterized by excellent time-stability.

These and other objects will be understood more fully from the following detailed description of our invention taken in conjunction with the attached figure of drawings which is an elevational edge view of a metal sheet carrying on a surface thereof a protective film derived from one or more coating compositions of the present invention. The vertical dimension of the view is greatly enlarged.

THE HYDROCARBON DRYING OILS

The hydrocarbon drying oils which compose the main film-forming component(s) of our improved coating compositions are polymeric, oily products prepared in various manners from about 60% to 100%, preferably 60% to 90%, by weight of conjugated diolefins having 4 to 6 carbon atoms. Examples of such diolefins are butadiene, isoprene, 2,3-dimethyl butadiene-1,3, piperylene, or 2-methyl pentadiene-1,3. Where the drying oil is prepared from such diolefins in an amount less than 100%, then the remainder can be copolymerizable vinylic hydrocarbons such as styrene or ring-alkylated homologues of styrene having 1 or 2 carbons in the alkyl group(s), i.e. methyl styrenes, dimethyl styrenes, ethyl styrenes and diethyl styrenes. The vinylic hydrocarbons preferably are used in amounts between about 10% and 40%, and more preferably between about 15 and 25%, by weight.

Such homo- and/or co-polymer drying oils can be prepared by mass polymerization methods using a variety of polymerization catalysts, e.g. metallic sodium (U.S. Patents 2,652,342, 2,762,851 and 2,826,618, or U.S. Patents 2,631,175, 2,636,910 and 2,826,621), $BF_3$-complex catalysts (U.S. Patents 2,708,639 and 2,777,890), or peroxide or other free-radical-liberating catalysts (U.S. Patent 2,669,526, Synthesis Method A). Emulsion-polymerized polymers and/or copolymers can also be benefitted. The oils have molecular weights between about 1000 and 10,000, preferably between 2000 and 8000. We especially prefer the oils prepared by the methods described in the Gleason Patents 2,652,342, 2,683,162 and 2,762,851. The disclosures of these and other patents referred to in this paragraph are here incorporated by reference.

In addition to being hydrocarbon drying oils of the varieties identified above, the oils which are employed in the practice of this invention must additionally, under some conditions of use, have been modified in whole or in part with acidic materials; e.g. the kinds taught by Gleason Patents 2,652,342 and 2,683,162; namely, thioglycolic acid, thiosalicylic acid, maleic anhydride, chloromaleic anhydride and citraconic anhydride and others. The amount of such acidic material(s) can range between about .01% and 8% or more by weight, based on the total weight of hydrocarbon drying oil but for maleic anhydride is preferably between about .01% and 2.0%. A portion of a batch of the oils which is to be used in can-coating work can be treated with acidic material(s) under the conditions described in the patents referred to above, so as to provide the total amount of acidic material(s) needed for the whole batch. The untreated drying oil can be added thereto to reduce the level of acidic material to whatever level is desired in the finished blend. Alternatively, the oil or a portion of it, can be appropriately mixed with acidic material(s) so as to dissolve and/or disperse the acidic material(s). Either of these procedures introduces enough acidic material to bring about special modifications of coating properties conferred by certain of the metallic complexes such as the aluminum complexes. In accordance with U.S. Patent 2,652,342, the drying oils are modified with maleic anhydride, chloromaleic anhydride and/or citraconic anhydride by heating a mixture of the anhydride(s) and drying oil at temperatures between about 50° and 250° C.

As noted above, the hydrocarbon drying oil component constitutes most of the film-forming material in our coating compositions. In this connection it should be noted that we seldom regard our chelated salts to be film-forming materials. When they are not so regarded, then the hydrocarbon oil(s) can, if desired, constitute the sole film-forming material(s) in our coatings.

THE METALLIC COMPLEXES

The metals involved in these components of our coatings are aluminum, iron and chromium. The aluminum complexes are preferably prepared from alkoxides of aluminum. The alkoxy groups can contain from 1 to 8 carbons but preferably are groups derived from readily volatile alcohols such as isopropyl, ethyl, butyl, etc., alcohols.

The preferred metal complexes are the partially chelated monocarboxylic acid salts represented by the formulae:

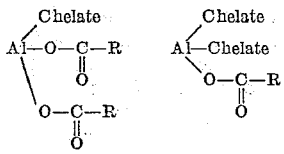

wherein "Chelate" represents an alkyl ester of acetoacetic acid having 1–8 carbon atoms in the alkyl group thereof, attached to the compound by both covalent and coordinate bonds, and wherein R represents a monovalent hydrocarbyl group having 8–18 carbon atoms.

Other metal complexes which are effective in overcoming the application defects referred to supra, but which are presently less preferred, are aluminum tri-chelates of the alkyl esters of acetoacetic acid defined in the preceding paragraph, iron tri-(2,4-pentanedionate), chromium tri-(2,4-pentanedionate), chromium tri-(acetoacetic alkyl ester), and aluminum tri-(2,4-pentanedionate).

Thus, the complexes are products in which the coordination forces of the metal are satisfied by means of:

(a) A chelating material, i.e. a material of tautomeric reaction such as 2,4-pentanedione, ethyl acetoacetate or other lower alkyl acetoacetic esters, with or without, (b) Monocarboxylic acids, preferably hydrocarbyl acids of about 8–18 carbon atoms.

Such chelates or chelated salts can be prepared in any of the usual and known ways, but in preparing the aluminum complexes we prefer to start with a lower alkoxide of the metal such as aluminum isopropoxide. The isopropoxy groups, for example, or a portion of them, are replaced by reaction with equivalent molar quantities of, say, ethyl acetoacetate thereby yielding the mono-, di- or tri-chelate. Where less than all of the alkoxy groups have been so replaced, the resulting reaction product can be further reacted with monocarboxylic acid(s) to replace most to all of the residual alkoxy groups. The same general procedure can be followed with the other metals, iron and chromium or where 2,4-pentanedione is the chelating compound and is used in amounts which effectively replace substantially all of the original alkoxy groups of the respective metallic alkoxides. Other methods for preparing the iron and chromium complexes are illustrated hereinafter. It will be recognized that the reactions outlined above are not necessarily 100% effective in replacing alkoxy groups so that the finished products are apt to contain small residual quantities of alkoxy groups. For our purposes such residual alkoxy groups are not harmful, but we prefer to conduct the reactions so that not more than about 20% of the original alkoxy content remains unreplaced on the metal.

The aluminum tri-chelate of ethyl acetoacetate can be prepared, if desired, by the method described in West German Patent 1,036,842 granted August 21, 1958, here incorporated by reference. The method is applicable also to other lower alkyl esters of acetoacetic acid.

British Patent 761,536, published November 14, 1956, here incorporated by reference, also describes methods for preparing aluminum complexes of the mixed acid/chelate types described herein.

It will be understood that the coating compositions of this invention are desirably products which are made up well ahead of the date of intended use, frequently as much as 12 months ahead. Such prepared compositions must then be stored until used. Frequently the storage occurs in drums or tanks placed outdoors so that the coating composition may be exposed to winter and summer temperatures. One facet of the present invention relates to the selection of chelated products which, in addition to being effective in overcoming the surface defects described earlier herein, are also of such chemical stability that there is little to no significant change in the character of the coating compositions during prolonged storage due to chemical reactivity, altered solubility, etc. The chelated aluminum salts are especially preferred because of their effectiveness and good time-stability characteristics. They also promote good intercoat adhesion between the cured hydrocarbon drying oil films and vinyl top-coats such as vinyl chloride/vinyl acetate copolymers or top coats prepared from a mixture of neutral and acidic vinyl chloride/maleate/fumarate diesters and half-esters/trichloroethylene interpolymers. For the latter acidic interpolymers and acidic/neutral mixtures see Rowland's U.S. Patent 2,731,449 and copending application Serial No. 562,366 filed January 30, 1956, respectively.

Another aspect of our invention stems from our discovery that the chelated metal complexes described herein can be additionally stabilized during prolonged storage by adding to a coating composition containing one or more of said complexes a small amount, e.g. 0.1% to 6% by weight, of lower alkyl esters of acetoacetic acid, said alkyl groups containing 1–8 carbon atoms.

The following examples illustrate the principles of our invention and include the best modes presently known to us for practicing those principles.

*Example 1*

An aluminum mono-linoleate dichelate was prepared from:

| | Lbs. |
|---|---|
| Aluminum isopropoxy di (acetoacetic ethyl ester) | 344 |
| Distilled linseed oil fatty acids | 280 |
| T.S. 28 Solvent [1] | 564 |

[1] A solvent naphtha, Kauri butanol value 68–74; distilling: initial 310–330° F.; 90% at 364°–379° F.; dry point 385°–398° F.; 7.1 lbs./gal.

The aluminum compound was charged to a kettle while continuously protected with a dry nitrogen atmosphere and was immediately covered with fatty acids. Nitrogen was then bubbled through the mass until the finished product had been recovered. The mass was heated to 210° F. at which temperature alcohol distillation commenced. The temperature was gradually increased to 350° F. at which temperature the collected alcohol amounted nearly to the theoretical amount. The mass was then cooled, reduced with the T.S. 28 solvent, and filtered. The resulting product had an A.S.T.M. non-volatile content of 31.1% and weighed 7.8 lbs. per gallon.

A coating composition using the above solution was prepared from the following materials by mixing together:

| | Lbs. |
|---|---|
| Maleic-modified copolymer drying oil [2] solution (50% solids in mineral spirits) | 84.2 |
| Chelated aluminum salt, supra | 1.0 |
| Mineral spirits | 14.8 |

[2] A sodium-polymerized 80% butadiene 20% styrene copolymer drying oil produced in accordance with U.S. Patent 2,762,851 and subsequently modified with maleic anhydride (.5% by wt.) in the manner disclosed in U.S. Patent 2,652,342.

The resulting coating composition was applied to tinplate from a batch of the latter which had previously induced crawling, pin-holing and other application defects when coated with a similar composition containing none of the chelated aluminum salt. The applied wet film resulting from the composition of this example was free of such defects and remained so through the baking treatment (10 minutes at 410° F.). The cured film had good gloss, and when tested for its resistance, protective and forming qualities, it was found to be superior in all respects to a similarly cured film (free of defects) secured from an otherwise similar composition except for being free of the chelated aluminum salt.

A sample of the liquid coating composition which had been set aside for a prolonged storage test indicated the composition to be of excellent time-storage stability.

*Examples 2 and 3*

The following chelated aluminum salts were prepared in the manner described in Example 1 by starting with aluminum isopropoxy di (acetoacetic ethyl ester):

Example—
2. Aluminum mono-oleate dichelate
3. Aluminum mono-acetate dichelate

The resulting products were added individually to the drying oil of Example 1 to prepare coating compositions. The mono-oleate dichelate was found to be compatible and effective in overcoming the described application defects, and to be of good time-stability in such compositions. The mono-acetate dichelate was found to be insoluble in the drying oil solution or in solvent alone.

*Example 4–7*

By starting with aluminium di-isopropoxy mono (acetoacetic ethyl ester) and reacting it with two moles of the acids indicated below, the following mono-chelated salts were prepared or attempted:

Example—
4. Aluminum di-octoate, monochelate
5. Aluminum di-pelargonate, monochelate
6. Aluminum di-tallate, monochelate
7. Aluminum di-rosinate, monochelate.

The products of Examples 4–6 were successfully prepared and were tested in the drying oil of Example 1 for effects on coating performance. All were found to be useful for overcoming the application defects. The product of Example 5, however, had poor time-stability qualities, so a coating containing it would need to be used up shortly after the salt had been added to the drying oil. The product of Example 7 was not prepared successfully because the reaction mass became too viscous to handle. No effective solvents could be found to enable the sought product to be produced.

When the ethyl acetoacetate was replaced with diacetone alcohol or pentanedione in the starting materials of Example 1–6, the resulting chelated salts were either insoluble in the hydrocarbon drying oil solutions or were too unstable to permit their use.

*Example 8*

The tri-chelate aluminum was prepared by reacting two moles of ethyl acetoacetate with aluminum di-isopropoxy mono-acetoacetic ethyl ester. The reaction of the mixture materials was effected by heating the mixture in glass equipment under a dry nitrogen atmosphere to about 250° F. and holding at this temperature while refluxing and removing the alcohol liberated by the replacement. An alcohol yield of 88% of theoretical was secured. When the reaction mass was cooled, it solidified at about room temperature.

The solid product was soluble in the hydrocarbon drying oil solution of Example 1 in an amount of about 2%, and when the resulting solution was diluted with additional solvent to form a coating composition comparable in solids content to that of Example 1, the composition was found to give very satisfactory, defect-free films on tin-plate. The films cured well and were glossy and free of defects.

*Example 9*

Coating compositions prepared from the chelated products of Examples 1–6 and 8 were applied to panels of tinplate and cured. Then the panels were top coated with a commercial vinyl chloride/vinyl acetate copolymer coating material (Goodrich Geon resin) and the applied coatings were cured. The panels were then subjected to a variety of tests including tests for intercoat adhesion. The latter tests revealed that the intercoat adhesion was excellent and in contrast with the poor adhesion found between the same topcoating material and the cured hydrocarbon drying oil films which contained no chelated aluminum salts.

*Example 10*

In a series of tests wherein aluminum alkoxides made from methyl, ethyl, propyl, butyl, amyl and 2-ethyl hexanol were reacted with lower alkyl esters of acetoaetic acid (wherein the alykyl groups ranged from 1 to 8 carbons), it was found that the alkoxy groups of the aluminum alkoxides were in every instance effectively displaced by the acetoacetic esters, and that the resulting mono- or di-chelates could in every instance be further reacted with mono-carboxylic acids (e.g. 2-ethyl hexoic acid and/or fatty acids of 8–18 carbons) to prepare chelted aluminum salts which were soluble in the hydrocarbon drying oil solution of Example 1 at levels of up to 5% of the salts by weight. When the resulting drying oil/chelated aluminum salt blends were coated on tin plate and cured, the films were found to be free of application defects and to otherwise form cured films meeting the present specifications on beverage can coatings of this type.

*Example 11*

In an effort to determine the necessity of using a maleic-modified hydrocarbon drying oil of the type described by Gleason in U.S. 2,652,342, some unmodified sodium-polymerized 80% butadiene/20% styrene copolymer oil prepared in the manner described by Gleason in U.S. Patent 2,762,851, was heat-bodied (see Gleason, U.S. Patent 2,672,425) to a viscosity duplicating the viscosity of the drying oil of Example 1. Then 1% by weight of maleic anhydride was added to the warm oil (e.g. 1200–140° F.). The resulting mixture was then agitated overnight in a jar placed on a jar-roller, at the end of which time it was found that the maleic anhydride appeared to be entirely dispersed. The chelated salt of Example 1 was then added to a portion of the drying oil/acid solution to a level of about 2.3% of the salt by wt. and the resulting mixture was thinned and applied to tin-plate. It was found to yield wet films free of the usual application defects. The wet films were cured and then examined. Except for a lower gloss than that of the coating of Example 1 they were sound, free of defects and otherwise of good protective quality.

In similar tests using a variety of different anhydrides and/or acids, it was found that only the anhydrides and/or acids which could be dissolved in the bodied hydrocarbon drying oil could be used effectively. Since only a few acids or anhydrides can be truly dissolved, the dispersing method of preparing our coating compositions significantly extends the number of different acidic compounds which can be used in practicing our invention.

*Example 12*

The following tests were made of a free-radical-polymerized polybutadiene drying oil with and without modification with the aluminum mono-linoleate dichelate of Example 1. The drying oil, in its as-received condition had the necessary acidity, so there was no need to treat it with acids of the kinds mentioned hereinabove. The drying oil was reduced with mineral spirits to a non-volatile content of 32.2%, at which concentration it had a viscosity of 56″ (No. 4 Ford cup). A portion of the reduced solution was modified with the aforesaid chelated salt by adding 4 grams of a 50% solution (by weight) of the chelate in T.S. 28 Solvent to 100 grams of the reduced drying oil solution. The modified and unmodified coating solutions were then applied to tin plate at the rate of 10 mg. per 4 sk. inches, and baked 10 minutes at 410° F. The unmodified solution gave a film having myriads of eyeholes and other defects, whereas the modified film was free of defects. By conventional countersink and edge/fracture tests it was found that the modified film had improved flexibility over that of the unmodified film.

*Example 13*

A coating composition was formulated as follows:

| | Lbs. |
|---|---|
| Maleic-modified copolymer drying oil solution [1] | 84.0 |
| Aromatic solvent | 10.3 |
| Butyl alcohol | 5.0 |
| Chelated salt of Example 1 | 0.5 |
| Ethyl acetoacetate | 0.2 |

[1] A sodium-polymerized butadiene (80%)/styrene (20%) copolymer produced in accordance with U.S. Patent 2,762,851 and subsequently modified with .5% maleic anhydride in the manner disclosed in U.S. Patent 2,652,342; 60% solids content in mineral spirits.

The composition yielded defect-free films on tin-plate both before and after baking. The liquid coating composition had excellent stability.

*Example 14*

Metallic iron powder was refluxed with a stoichiometric excess of 2,4-pentanedione until a sample of the reaction mixture, when cooled, precipitated red crystals of ferric pentanedionate. The whole mass was then cooled, and the red crystals were filtered off and dissolved in xylene, and the resulting solution was used to prepare a blended coating composition containing about 50% non-volatile matter composed of 98.7% of the hydrocarbon drying oil of Example 1 and 1.33% of the crystalline ferric pentanedionate.

The coating composition was applied over tin-plate previously marked with crayon. The wet film covered the crayon marks excellently and gave no indication of crawling away from such marks. The applied coating cured to a defect-free film.

*Example 15*

A high viscosity acidic peroxide-polymerized copolymer drying oil prepared from 80% of butadiene and 20% of styrene and dissolved in mineral spirits to a solids content of 30% was modified by adding the chelate solution of Example 1:

| | G. |
|---|---|
| 30% solution of drying oil | 100 |
| 50% solution of chelate salt | 4 |

The resulting mixed coating composition was applied to tin-plate and baked 10 minutes at 410° F. The film before and after baking was free of pin-holes, crawling, etc. whereas a similar wet film of the unmodified drying oil exhibited many of such defects. The defects remained after the film was baked. Similar results were secured on galvanized iron, copper, aluminum, black iron and terneplate.

*Example 16*

(A) Preparation of chromium (ethyl acetoacetate)₃:
Reflux 25 grams $CrCl_3.6H_2O$ with 200 grams of ethyl acetoacetate. Reflux continued for 2 hrs. and solution was then concentrated to a non-volatile content of 72.5%. A sample was ashed. The analysis showed a $Cr_2O_3$ content of 16.55% on a solids basis or 11.3% Cr. This corresponds to a theoretical chromium content of 11.8% in the trichelate.

(B) A coating composition was formulated as follows:

| | |
|---|---|
| Maleic modified copolymer drying oil solution of Example 1 | 64.8 |
| Toluene | 30.1 |
| Cr (ethyl acetoacetate)₃ (72.5% solids, above) | 5.1 |
| | 100.0 |

The composition yielded a system with improved wet out over crayon marks (Blaisdell China Marking Pencil) on a tin plate panel baked 10' at 410° F.

*Example 17*

Chromium (2,4-pentanedione)₃ was prepared by refluxing $CrCl_3.6H_2O$ with 2,4-pentanedione:

| | |
|---|---|
| $CrCl_3.6H_2O$ | 53.4 |
| Diethylene glycol monoethyl ether | 500.0 |
| 2,4-pentanedione | 200.0 |

This reaction mixture was concentrated to 300 ml. by heating in an open reaction vessel. The color of the solution at this stage was dark green. An additional 200 gms. of 2,4-pentanedione were added and the solution brought to reflux. Sampling the solution and adding to cold water indicated a deep purple crystallization. The reaction mass was discharged into 1000 ml. of cold water. The crystals formed were separated by filtration and dried at 105° C.

A 5% solution of the Cr pentanedionate was prepared in toluene. The following coating composition was formulated:

| | |
|---|---|
| Maleic modified copolymer solution of Example 1 | 47.0 |
| 5% solution Cr pentanedionate | 31.3 |
| Butyl alcohol | 21.7 |
| | 100.0 |

Coatings prepared on tin plate on which crayon marks (China Marking Pencil) were applied gave a definite improvement, minimizing the crawl-away normally observed at the crayon marks in an untreated system.

It will be appreciated from the foregoing examples and other description of our invention that our metallic complexes solve a serious application problem formerly encountered with the hydrocarbon drying oils described hereinabove. In addition the complexes contribute other benefits in film properties and film characteristics. One outstanding contribution of the complexes is their ability to render the complex-modified films capable of being cured quickly at normal baking temperatures or at the more elevated temperatures of "flame-curing," i.e. under the curing conditions where a visible flame is in direct contact with the applied wet coating for a brief period of time.

While our described coating compositions have particular use as can coatings, and for such purposes are ordinarily unpigmented, our compositions have merit as protective coatings on metals and other substrates which are in forms other than that of cans or containers for foods and beverages. For such uses the coatings can, if desired, be pigmented, dyed, or otherwise modified in hiding, color, and film qualities. The disclosures of U.S. Patent 2,652,342 in respect to pigmentation of comparable hydrocarbon drying oil films are here incorporated by reference.

Having described our invention, what we claim is:

1. An improved coating composition for metals particularly adapted for use directly on tin-plated ferrous metal, said composition comprising as the principal vehicle thereof an organic solvent solution in which the dissolved solids consist essentially of: (a) polymeric hydrocarbon drying oil prepared from 60–100% of conjugated diolefins of 4–6 carbon atoms with any remainder consisting essentially of monocyclic vinylic hydrocarbons selected from the group consisting of styrene and ring-substituted alkylated styrenes in which the alkyl groups contain 1–2 carbon atoms, said hydrocarbon drying oils being further modified subsequent to polymerization with .01% to 8% by weight of acidic materials selected from the group consisting of thioglycolic acid, thiosalicylic acid, maleic anhydride, chloro-maleic anhydride and citraconic anhydride; (b) from about .01 to 10% by weight based on the acid-modified drying oil of part (a), of at least one metallic complex selected from the group consisting of the aluminum complexes and mixtures thereof corresponding to the formulae:

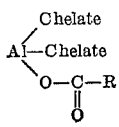

and

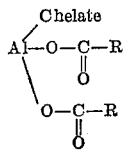

and (c) from about 0.1 to 6% by weight of added lower alkyl esters of acetoacetic acid, said esters containing 1–8 carbons in the alkyl group thereof.

2. A coating composition as claimed in claim 1 wherein the copolymer was prepared from about 80% of butadiene and about 20% of styrene, and wherein the said copolymer has been combined with .01%–2% by weight of maleic anhydride.

3. A metal sheet having at least one face thereof coated with a baked and cured protective film of the coating composition claimed in claim 1.

4. A metal sheet having at least one face thereof coated with a baked and cured protective film of the coating composition claimed in claim 2.

5. The method of overcoming application defects in a polymeric hydrocarbon drying oil prepared from 60–100% of conjugated diolefins of 4–6 carbon atoms with any remainder consisting essentially of monocyclic vinyl hydrocarbon selected from the group consisting of styrene and ring-substituted alkylated styrenes in which the alkyl groups contain 1–2 carbon atoms, which comprises the steps of: (a) treating an organic solvent solution of said drying oil with .01 to 8% by weight of acidic material selected from the group consisting of thioglycolic acid, thiosalicylic acid, maleic anhydride, chloro-maleic anhydride and citraconic anhydride to produce a substantially homogeneous, single phase modified drying oil solution, and (b) blending said acid-modified drying oil solution with (1) at least one metallic complex selected from the group consisting of the aluminum complexes and mixtures thereof corresponding to the formulae:

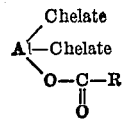

and

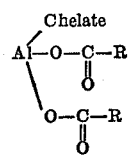

and (2) from about 0.1 to 6% by weight of added lower alkyl esters of acetoacetic acid, said esters containing 1–8 carbons in the alkyl group thereof.

6. The method as claimed in claim 5 wherein the copolymer was prepared from about 80% of butadiene and 20% of styrene, and wherein said copolymer has been combined with .01%–2.0% of maleic anhydride.

References Cited in the file of this patent

UNITED STATES PATENTS

| | | |
|---|---|---|
| 2,479,409 | Roedel | Aug. 16, 1949 |
| 2,638,461 | St. John | May 12, 1953 |
| 2,652,342 | Gleason | Sept. 15, 1953 |
| 2,762,851 | Gleason | Sept. 11, 1956 |
| 2,826,621 | Crouch | Mar. 11, 1958 |
| 2,827,388 | Mayer et al. | Mar. 18, 1958 |
| 2,839,421 | Albisetti | June 17, 1958 |
| 2,892,780 | Rinse | June 30, 1959 |
| 2,933,475 | Hoover et al. | Apr. 19, 1960 |